United States Patent [19]

Wakimoto et al.

[11] Patent Number: 5,276,381
[45] Date of Patent: Jan. 4, 1994

[54] ORGANIC ELECTROLUMINESCENT DEVICE

[75] Inventors: Takeo Wakimoto; Ryuji Murayama; Hitoshi Nakada, all of Tsurugashima; Masaharu Nomura; Giichi Sato, both of Tokyo, all of Japan

[73] Assignees: Pioneer Electronic Corporation; Nippon Kayaku Kabushiki Kaisha, both of Tokyo, Japan

[21] Appl. No.: 841,491

[22] Filed: Feb. 26, 1992

[30] Foreign Application Priority Data

Sep. 12, 1991 [JP] Japan .................................. 3-233189

[51] Int. Cl.⁵ ............................................ H05B 33/14
[52] U.S. Cl. ..................................... 313/504; 313/506; 315/169.3; 428/917; 345/76
[58] Field of Search ............... 313/500, 501, 503, 504, 313/505, 506, 509, 510; 428/690, 691, 917; 340/781; 315/169.3

[56] References Cited

U.S. PATENT DOCUMENTS 5,059,861 10/1991 Littman et al. .................. 313/504 X
5,104,740 4/1992 Shinkai et al. .................. 313/504 X
5,104,749 4/1992 Sato et al. ....................... 313/504 X

FOREIGN PATENT DOCUMENTS 59-194393 11/1984 Japan .
63-264692 11/1988 Japan .

Primary Examiner—Donald J. Yusko
Assistant Examiner—Ashok Patel
Attorney, Agent, or Firm—Foley & Lardner

[57] ABSTRACT

An organic electroluminescent device which includes a cathode, an organic emitting layer which includes a quinoline derivative and a quinacridone or quinazoline compound, an organic positive hole transport layer, and an anode, laminated in sequence, has a high emission efficiency and a high color purity of light emitted from the EL device.

3 Claims, 3 Drawing Sheets

EMISSION

EMISSION

ORGANIC ELECTROLUMINESCENT DEVICE

BACKGROUND OF THE INVENTION

1. Field of the Invention

The present invention relates to an electroluminescent (EL) device having an emitting layer made of an emitting substance, which utilizes an electroluminescence phenomenon that the emitting substance emits light by applying an electric current to the emitting layer. More particularly, it is concerned with an organic EL device in which the emitting layer is made of an organic emitting substance.

2. Description of the Prior Art

As such type of EL devices, there have been known a device having two layers each made of an organic compound, as shown in FIG. 1, in which an organic fluorescent film or emitting layer 3 and an organic positive-hole transport layer 4 are arranged between a metal electrode or cathode 1 and a transparent electrode or anode 2, the two layers being layered on each other. There have been also known an EL device of three-layer structure, as shown in FIG. 2, in which an organic electron transport layer 5, an organic fluorescent film 3 and an organic positive-hole transport layer 4, are arranged between a metal electrode 1 and a transparent electrode 2. The organic positive-hole transport layer 4 herein has a function to facilitate the injection of positive holes from an anode as well as another function to block electrons, while the organic electron transport layer 5 has a function to facilitate the injection of electrons from a cathode.

In these EL devices where a glass substrate 6 is arranged outside the transparent electrode 2, excitons are generated from the recombination of the electrons injected from the metal electrode 1 with the positive holes injected to the organic fluorescent film 3 from the transparent electrode 2. At the stage where the excitons are inactivated through radiation, they emit light radiating toward outside through the transparent electrode 2 and the glass substrate 6 (the Japanese Patent Laid-open No. 59-194393).

As is disclosed in the Japanese Patent Laid-open No. 264692/1988, there have been also known stably emitting el devices comprising a fluorescent film formed from an organic host material and a fluorescent guest material.

It is however expected to develop an EL device capable of emission at a further high luminance, although the conventional EL devices with such aforementioned composition comprising organic compounds can emit light at a lower voltage.

SUMMARY OF THE INVENTION

The present invention is intended to provide EL devices capable of emission at a high luminance.

The gist of the present invention resides in an organic EL device comprising a cathode, an emitting layer of organic compound including a quinoline derivative, a positive hole transport layer of organic compound and an anode which are laminated in sequence, wherein the emitting layer further including a quinacridone compound represented by the structure formula 1 below

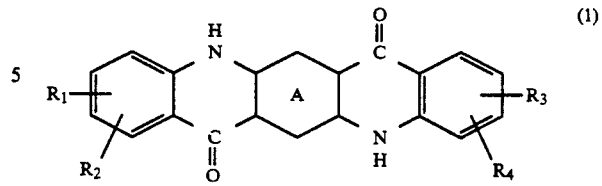

or including a quinazoline compound represented by the structure formula 2 below

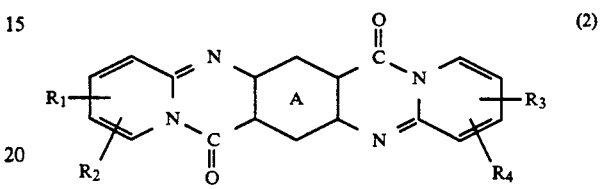

where ring A

is

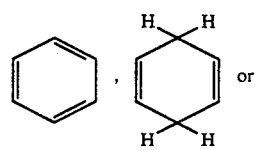

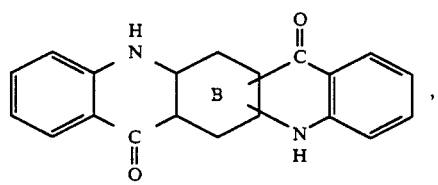

ring B

is

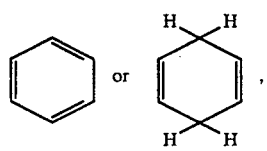

$R_1$–$R_4$ are independently hydrogen atom, halogen atom, alkyl group or alkoxy group, or $R_1$ and $R_2$ or $R_3$ and $R_4$ together form a fused benzene ring or

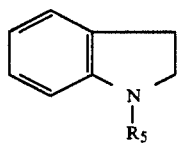

$R_5$ is alkyl group, expecting the combination that $R_1$-$R_4$ are hydrogen atoms at the same time, the combination that $R_1$ and-$R_3$ are hydrogen atoms at the same time $R_2$ and-$R_4$ methyl groups, and the combination that $R_1$ and-$R_3$ are hydrogen atoms at the same time $R_2$ and-$R_4$ are chlorine atom, when said ring A in the formula 1 is

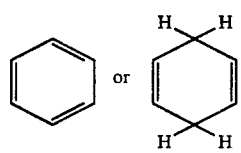

The present invention will now be explained in detail with reference to accompanying drawings.

DETAILED DESCRIPTION OF PREFERRED EMBODIMENT

Figure 1:
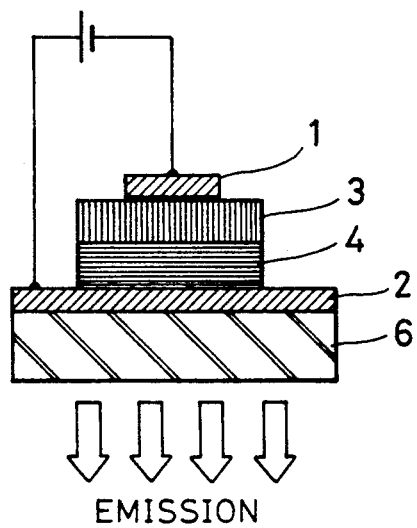
FIG. 1 is a schematic representation showing a known two-layer structure of an EL device that is useful in the present invention.
Figure 2:
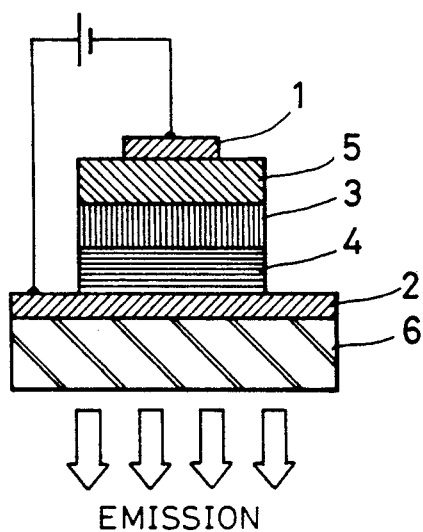
FIG. 2 is a schematic representation showing a known three-layer structure of an EL device that is useful in the present invention.

The EL device in accordance with the present invention is similar to the organic EL device of the structure shown in FIG. 1 or 2. Such an EL device may have the two-layer structure formed by layering a fluorescent emission layer 3 and a positive-hole transport layer 4 between a pair of a metal cathode 1 and a transparent anode 2 as shown FIG. 1. The EL device also may have the three-layer structure formed by layering an organic electron transport layer 5, the organic fluorescent film 3 and the organic positive-hole transport layer 4 in sequence between a pair of the metal cathode 1 and the transparent anode 2. In the both structures of the device, at least one of the electrodes 1 and 2 may be transparent. As the cathode, there may be used metal with a low work function and of a thickness of about 100-5000 angstroms or more, such as aluminum, magnesium, indium, silver or alloys of the individual metals. As the anode, there may be used a conductive material with a high work function, for example, indium tin oxide (ITO) of a thickness of about 1000-3000 angstroms, or gold of a thickness of about 800 to 1500 angstroms. The electrode employing gold as its material gets semitransparent.

The emitting layer 3 of the organic EL device preferably includes at least one quinoline derivative of the host material such as aluminum complex of 8-hydroxyquinoline, namely tris(8-quinolinol)aluminum or aluminum oxine chelate (hereinafter referred as "Al$q_3$") represented by the following structure of formula 3.

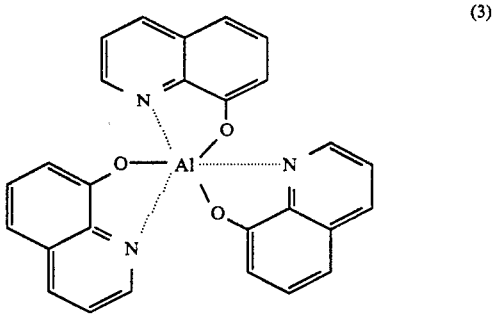

Other host materials of quinoline derivatives preferably used in the fluorescent emitting layer are, for example, bis(8-quinolinol) magnesium, bis(benzo{f}-8-quinolinol)zinc, bis(2-methyl-8-quinolinolate)aluminum oxide, tris(8-quinolinol)indium, tris(5-methyl-8-quinolinol)aluminum, 8-quinolinol lithium, tris(5-chloro-8-quinolinol)gallium, bis(5-chloro-8-quinolinol)-calcium, and poly[zinc(II)-bis(8-hydroxy-5-quinolinyl)methane].

The guest materials preferably used in the fluorescent emitting layer 3 are quinacridone compounds such as 3,4,10,11-tetrachloroquinacridone compound represented by the following formula (4),

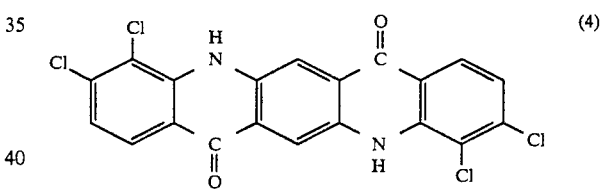

1,4,8,11-tetrachloroquinacridone compound represented by the following formula (5),

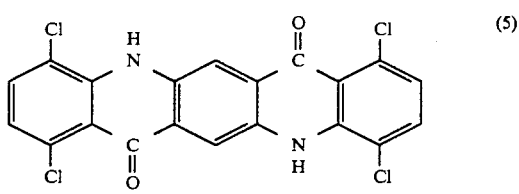

2,4,9,11-tetrachloroquinacridone compound represented by the following formula (6),

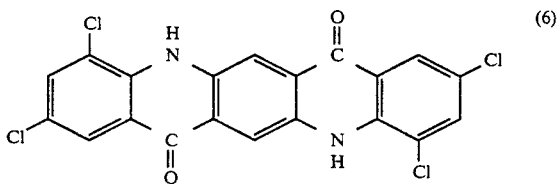

2,3,9,10-tetrachloroquinacridone compound represented by the following formula (7),

1,3,8,10-tetrachloroquinacridone compound represented by the following formula (8),

and 1,2,8,9-tetrachloroquinacridone compound represented by the following formula (9).

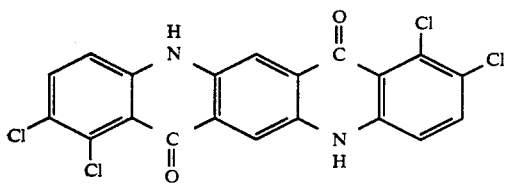

Other quinacridone halides of guest materials preferably used in the fluorescent emitting layer are 1,4,8,11-, 2,4,9,11- or 1,3,8,10-tetrabromoquinacridone compound, 1,4,8,11- or 2,49,11-tetrabromoquinacridone compound, 2,4,9,11-tetraiodoquinacridone compound. The compound of 2,8,9,11-tetrabromoquinacridone represented by the following formula (10)

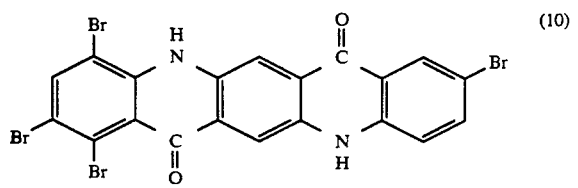

is also used.

Further other compound of guest materials preferably used in the fluorescent emitting layer are 1,4,8,11-, 2,4,9,11-, 1,3,8,10- or 1,2,8,9-tetramethylquinacridone.

The compound of 1,8-dichloro-4,11-dimethylquinacridone represented by the following formula (11)

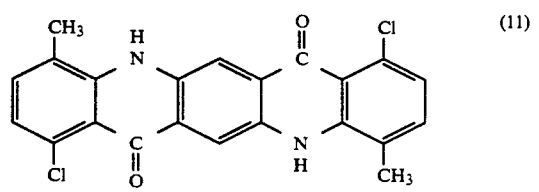

is also used.

Furthermore other compound of guest materials preferably used in the fluorescent emitting layer are 2,9-dimethyl-3,10-dichloroquinacridone, 3,10-dichloro-4,11-dimethylquinacridone, 1,8-dimethyl-3,10-dichloroquinacridone, 2,9-dichloro-4,11-dimethylquinacridone and 2,9-dimethyl-4,11-dichloroquinacridone.

The compound of 2,9-dimethyl-4,11-diethoxyquinacridone represented by the following formula (12)

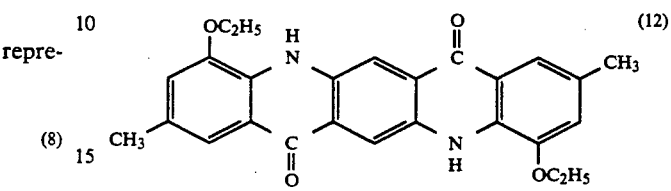

is also used. The compounds of 2,9-diethoxy-4,11-dimethylquinacridone and 2,4,9,11-tetramethoxyquinacridone are also used.

The compounds of 6,16-dihydro derivatives derived from the all quinacridone compounds above mentioned, are preferably used for the guest materials in the EMitting layer. For example, one of the derivatives from the compound of formula 11, i.e., 2,9-dimethyl-4,11-diethoxy-6,13-dihydroquinacridone represented by the following formula (13)

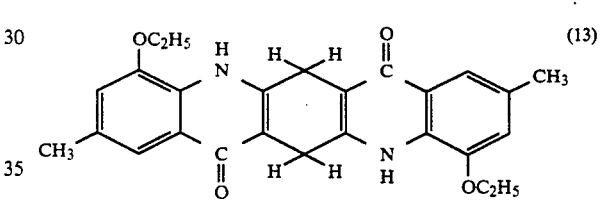

is preferably used.

Further, the guest materials preferably used in the fluorescent emitting layer 3 are quinacridone compounds such as 3,4,10,11-dibenzo derivative represented by the following formula (14),

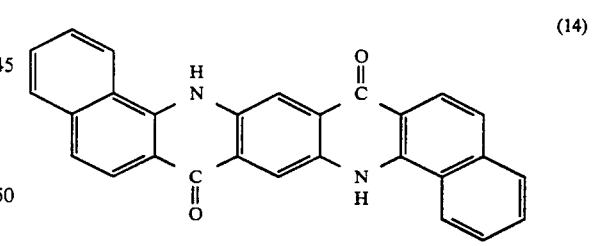

1,2,8,9-dibenzo quinacridone derivative represented by the following formula (15),

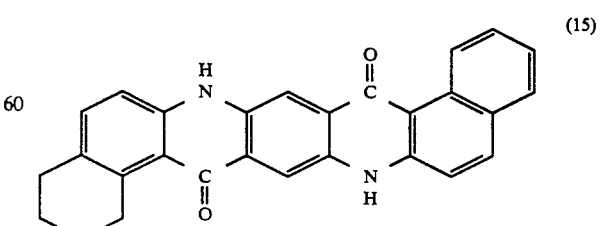

and 2,3,9,10-dibenzo quinacridone derivative represented by the following formula (16).

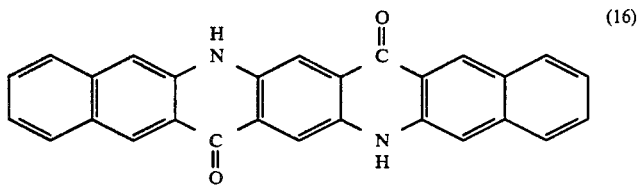

(16)

The quinacridone derivative represented by the following formula (17)

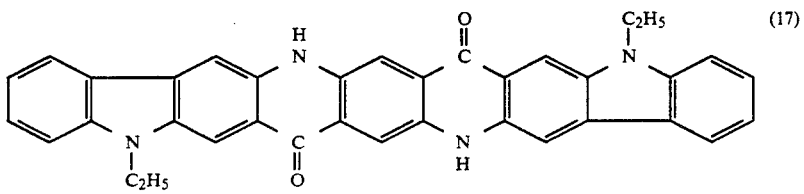

and the quinazoline compound derivative represented by the following formula (18)

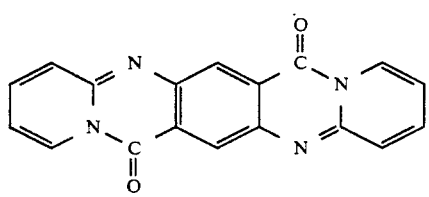

are preferably used.

The quinacridone derivatives each confused with a benzene ring represented by the following formulae (19) and (20)

are preferably used. The dihydro derivatives derived from the all quinacridone or quinazoline compounds above mentioned, are also preferably used for the guest materials in the emitting layer.

The quinacridone or quinazoline compound represented by one of the above formulae, is contained at a concentration of 0.01 wt % to 10 wt % in the fluorescent emitting layer comprising the aluminum complex of 8-hydroxyquinoline. The reason is that emission with a higher luminance can be obtained at a low applied voltage.

Next, it is preferable that the hole transport layer is made of N, N' -diphenyl-N-N'-bis(3-methylphenyl)-1,1'-biphenyl-4,4'-diamine (hereinafter referred as "TPD") represented by the following chemical formula 21. Further, the compounds known as CTM (carrier transporting materials) represented by the following formulas 22 to 32 are suitably used alone or as mixture for the first hole transport layer.

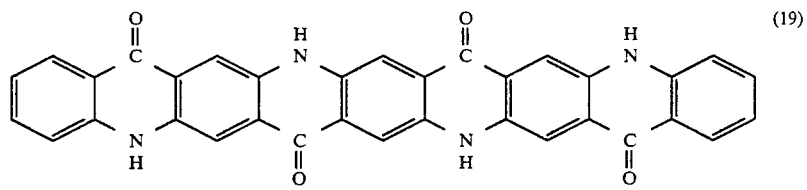

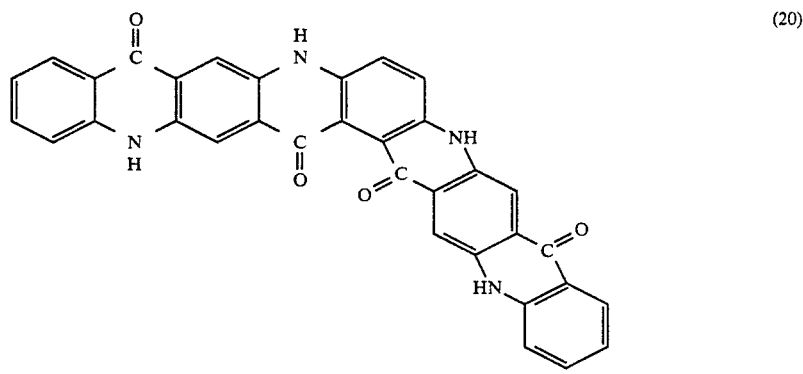

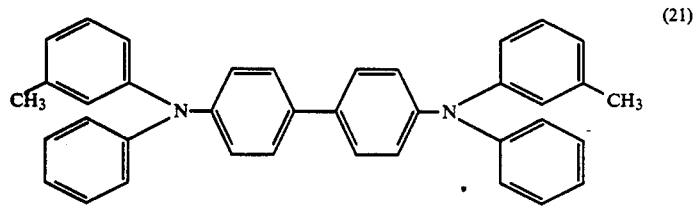
(21)
(22)
(n represents an integer.)
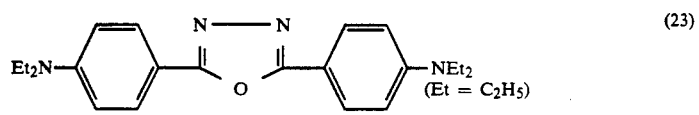
(23)
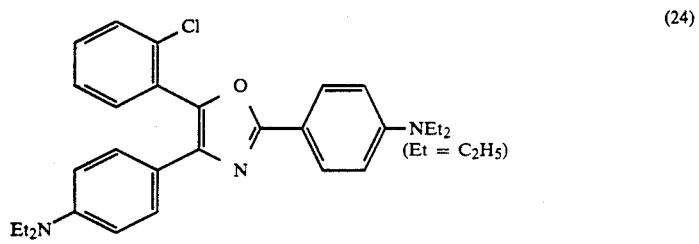
(24)
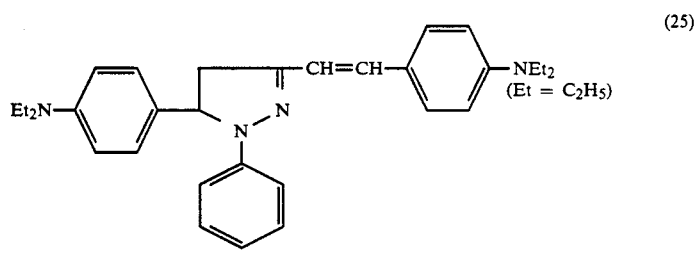
(25)
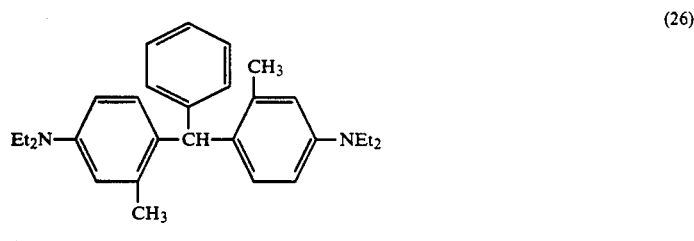
(26)
(Et = C₂H₅)
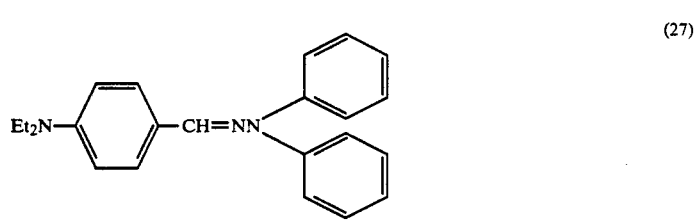
(27)
(Et = C₂H₅)

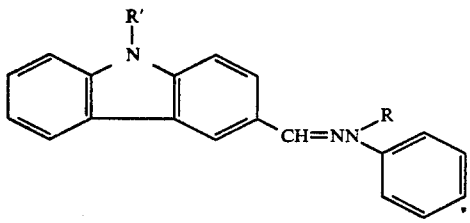

(R and R' represent an alkyl group.)

(28)

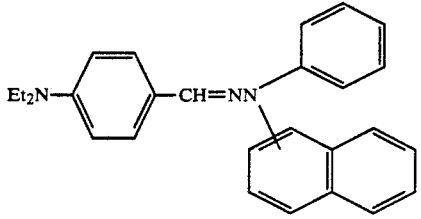

(Et = C₂H₅)

(29)

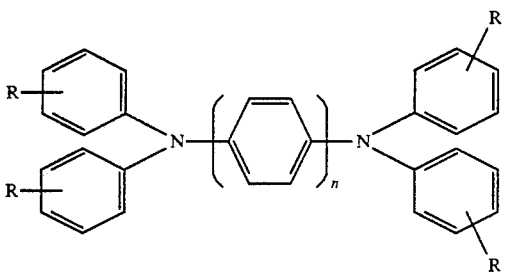

(R represents an alkyl group, and n is an integer.)

(30)

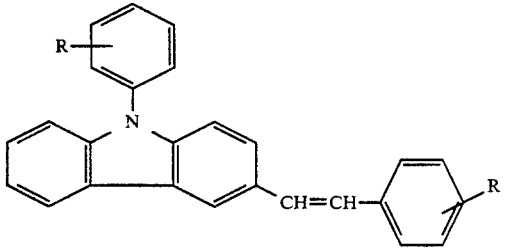

(R represents an alkyl group.)

(31)

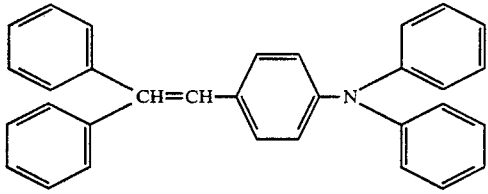

(32)

In this way, these embodiments of the EL device are formed in the form of the two-layer structure in which a fluorescent emission layer 3 and a positive-hole transport layer 4 are arranged between a pair of a metal cathode 1 and a transparent anode 2 as shown FIG. 1. Furthermore, the EL device having the three-layer structure, i.e., an organic electron transport layer 5, the organic fluorescent film 3 and the organic positive-hole transport layer 4 being laminated in sequence between the cathode 1 and the anode 2, has the same advantageous effect as the two-layer structure above mentioned. A perylene tetracarboxyl derivative represented by the following formula 33 is preferably used for the organic electron transport layer 5. The electron transport layer 5 of organic EL device is also preferably made of Bu-PBD [2-(4'-tert-butylphenyl)-5-(biphenyl)-1,3,4-oxadiazole] represented by the following chemical formula 34. Examples of suitable organic compounds which may be employed as the electron transport layer 5 are represented by the following formulas 35 to 44.

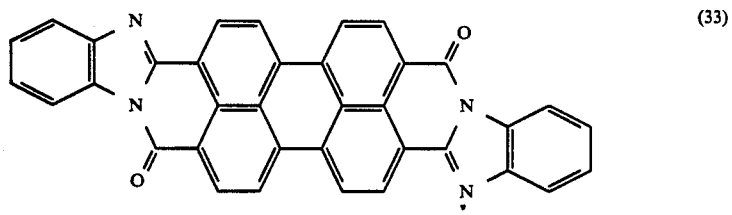 (33)
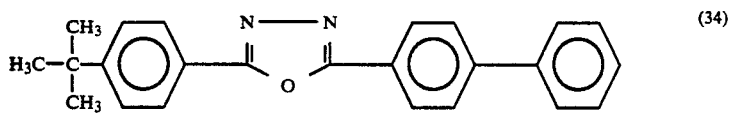 (34)
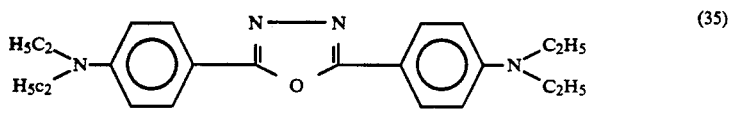 (35)
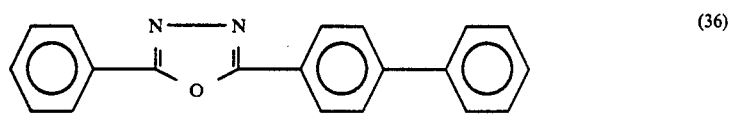 (36)
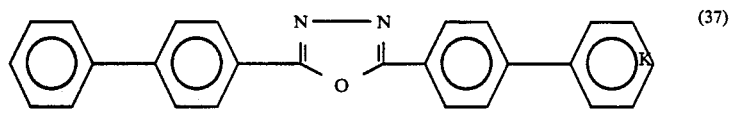 (37)
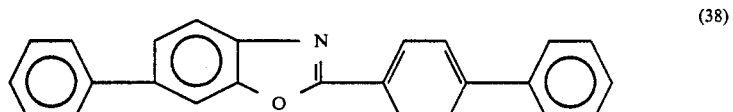 (38)
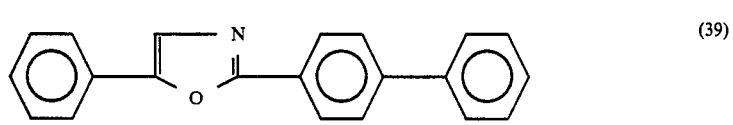 (39)
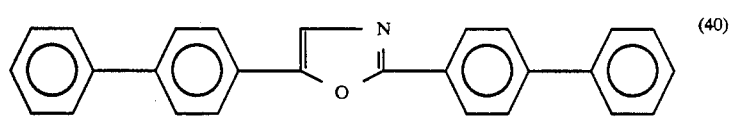 (40)
 (41)
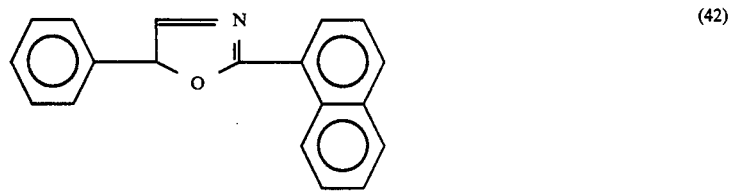 (42)
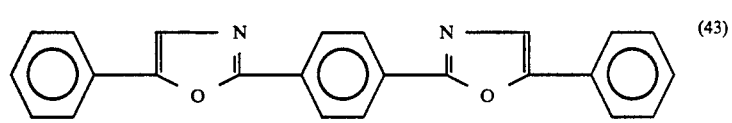 (43)
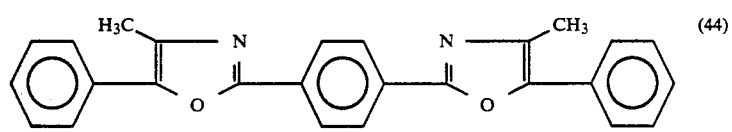 (44)

EXAMPLE 1

A glass substrate on which an anode of ITO had been formed at 2000 Å thick, was prepared. The following thin films were formed by a vacuum deposition method at a vacuum conditions equal to or less than $1.0 \times 10^{-5}$ Torr. Firstly, TPD of formula 21 was deposited on the ITO anode with the thickness of 500 Å as a hole transport layer at the vacuum deposition rate of 3.5 Å/sec. Next, $Al_{q3}$ of formula 3 and the quinacridone derivative of formula 14 were co-deposited on the TPD layer as an emitting layer by using the different sources. In this case, the concentration of the quinacridone derivative of formula 14 in the EMitting layer was 0.32 wt % as a guest material. The $Al_{q3}$ portion was co-deposited at the vacuum deposition rate of 10 Å/sec. Then, magnesium and silver were vacuum co-deposited on the emitting layer of $Al_{q3}$ with the thickness of 1600 Å (atomic ratio of Mg:Ag=10:1). The Mg portion was co-deposited at the vacuum deposition rate of 20 Å/sec.

Figure 3:
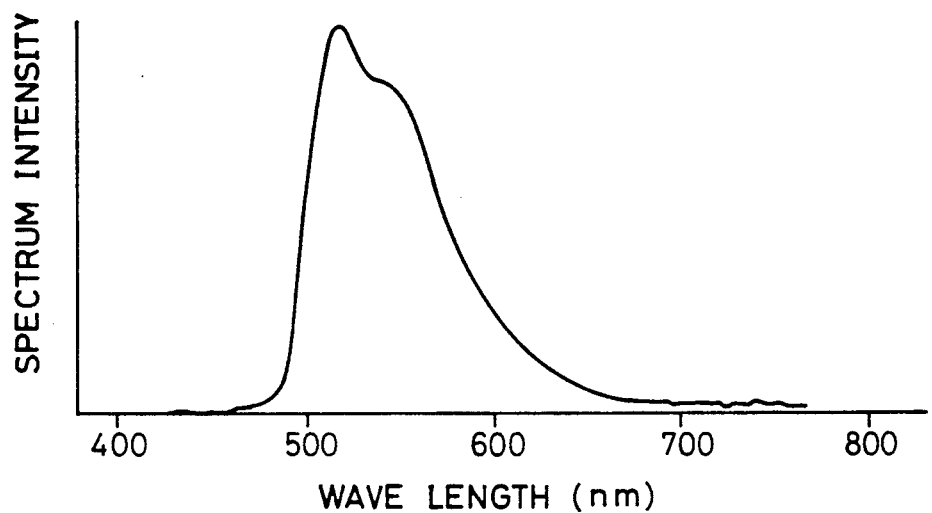
FIG. 3 is a graph representing the emission spectra characteristic of EL devices of Example 1.

When the resultant EL device was operated with the application of DC voltage at the constant current density of 25 $mA/cm^2$. The emission of this EL device is luminance of 1800 $cd/m^2$ and the maxim luminance of 47100 $cd/m^2$. The luminous efficiency of the EL device was 1.80 lm/W. FIG. 3 shows the emission spectrum distribution of this Example 1 of the EL device.

EXAMPLE 2

Instead of the quinacridone derivative of guest material in Example 1, an EL device was assembled by the same procedure as in Example 1 while using the Quinazoline derivative represented by formula 18 as a guest material.

Figure 4:
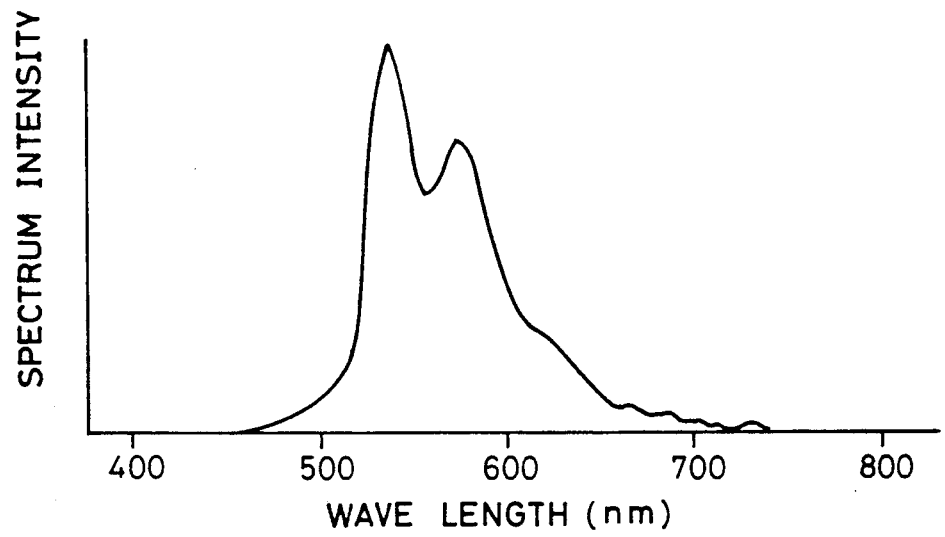
FIG. 4 is a graph representing the emission spectra characteristic of EL devices of Example 2.

When the resultant EL device was operated with the application of DC voltage at the constant current density of 25 $mA/cm^2$. The emission of this EL device is luminance of 828 $cd/m^2$ and the maxim luminance of 28000 $cd/m^2$. The luminous efficiency of the EL device was 1.15 lm/W. FIG. 4 shows the emission spectrum distribution of this Example 2 of the EL device.

EXAMPLE 3

An EL device was assembled by the same procedure as in the Example 1, except that the emitting layer has the quinazoline derivative represented by formula at the concentration of 0.9 wt % as a guest material.

Figure 5:
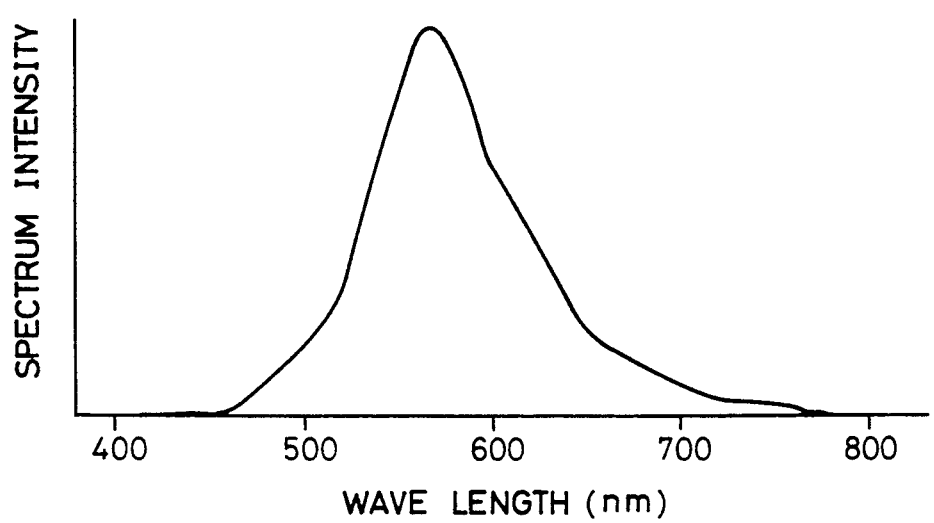
FIG. 5 is a graph representing the emission spectra characteristic of EL devices of Example 3.

When the resultant EL device was operated with the application of DC voltage at the constant current density of 25 $mA/cm^2$. The emission of this EL device is luminance of 329 $cd/m^2$ and the maxim luminance of 9470 $cd/m^2$. The luminous efficiency of the EL device was 0.33 lm/W. FIG. 5 shows the emission spectrum distribution of this Example 3 of the EL device.

As described above, the organic EL device according to the present invention having a cathode, an organic emitting layer including a quinoline derivative, an organic hole transport layer and an anode which are laminated in sequence, is characterized in that the emitting layer further includes a quinacridone compound represented by formula 1 or including a quinazoline compound represented by formula 2. Because of this construction of the EL device, it emits light at a high luminance upon application of a low voltage. In this way, it is possible according to the present invention to improve the emission efficiency of the EL device and the color purity of light emitted from the EL device and to obtain the preferable emission spectrum distribution with a narrow and pointed spectrum peak.

What is claimed is:

1. An organic electroluminescent device comprising a cathode, an organic emitting layer comprising a quinoline derivative, an organic positive hole transport layer, and an anode, which are laminated in sequence, wherein said emitting layer further comprises a compound selected from the group consisting of a quinacridone compound represented by the structure formula 1 below

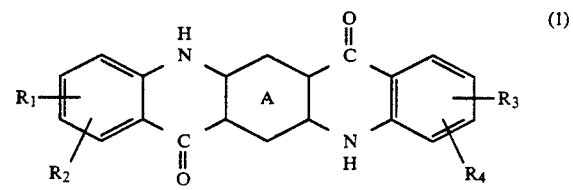

and a quinazoline compound represented by the structure formula 2 below

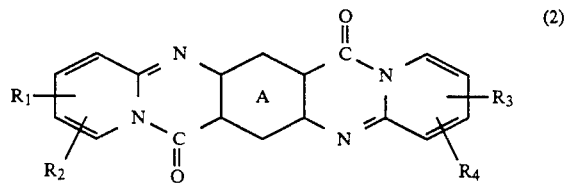

where ring A

is

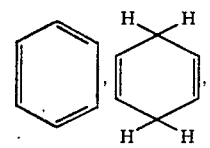

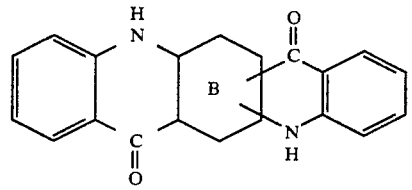

ring B

is

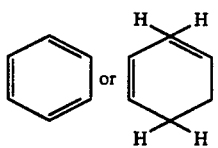

$R_1$–$R_4$ are independently a hydrogen atom, halogen atom, alkyl group, or alkoxy group, or $R_1$ and $R_2$ or $R_3$ and $R_4$ together form a fused benzene ring or

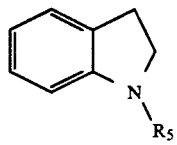

wherein $R_5$ is an alkyl group, provided that, when said ring A of formula 1 is

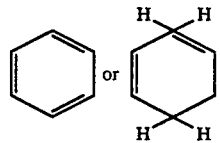

$R_1$–$R_4$ are not all hydrogen atoms, $R_1$ and $R_3$ are not hydrogen atoms, when $R_2$ and $R_4$ are methyl groups, and $R_1$ and $R_3$ are not hydrogen atoms when $R_2$ and $R_4$ are chlorine atoms.

2. An organic electroluminescent device according to claim 1, wherein said quinoline derivative is the Aluminum complex of 8-hydroxyquinoline.

3. An organic electroluminescent device according to claim 1 further comprising an organic electron transport layer arranged between said cathode and said emitting layer.

* * * * *